(12) United States Patent
Oikawa et al.

(10) Patent No.: US 10,562,559 B2
(45) Date of Patent: Feb. 18, 2020

(54) RACK BAR AND METHOD FOR MANUFACTURING RACK BAR

(71) Applicant: HITACHI AUTOMOTIVE SYSTEMS, LTD., Hitachinaka-shi, Ibaraki (JP)

(72) Inventors: Satoru Oikawa, Higashimatsuyama (JP); Shuuji Nakasuka, Ogawa-machi (JP); Shinichi Yamanaka, Sayama (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 372 days.

(21) Appl. No.: 15/500,950

(22) PCT Filed: May 25, 2015

(86) PCT No.: PCT/JP2015/064876
§ 371 (c)(1),
(2) Date: Feb. 1, 2017

(87) PCT Pub. No.: WO2016/031323
PCT Pub. Date: Mar. 3, 2016

(65) Prior Publication Data
US 2017/0225703 A1   Aug. 10, 2017

(30) Foreign Application Priority Data
Aug. 25, 2014 (JP) .................. 2014-169982

(51) Int. Cl.
*F16H 1/04* (2006.01)
*B62D 3/12* (2006.01)
(Continued)

(52) U.S. Cl.
CPC .............. *B62D 3/126* (2013.01); *B21K 1/767* (2013.01); *B62D 3/12* (2013.01); *F16H 19/04* (2013.01); *F16H 55/26* (2013.01)

(58) Field of Classification Search
CPC ...................................................... B21K 1/767
See application file for complete search history.

(56) References Cited

U.S. PATENT DOCUMENTS 8,176,763 B2 *   5/2012   Eckstein ................ B21K 1/767
72/368
2005/0115298 A1   6/2005   Brenner
(Continued)

FOREIGN PATENT DOCUMENTS

JP   2000-211536 A   8/2000
JP   2013-526407 A   6/2013

*Primary Examiner* — Jake Cook
(74) *Attorney, Agent, or Firm* — Foley & Lardner LLP (57) ABSTRACT

Rack bar 10 for transmitting a steering operation to steered wheels while converting a rotational movement of a pinion shaft rotatably connected to a steering wheel into an axial movement, the rack bar being formed by conducting a die forging process on a material having an approximately circular cross section. A pair of face width-enlarged portions 15 is provided at both ends that rack teeth 14 have in face width direction. With this, it becomes possible to ensure face width dimension W of rack teeth 14 larger than outer shape S of a circular cross section of rack main body 13 (material), which results in an improvement of a contact gear ratio between the pinion teeth and the rack teeth.

6 Claims, 5 Drawing Sheets

(51) Int. Cl.
*B21K 1/76* (2006.01)
*F16H 19/04* (2006.01)
*F16H 55/26* (2006.01)

(56) References Cited

U.S. PATENT DOCUMENTS

2013/0042662 A1 2/2013 Cornish
2013/0192330 A1 8/2013 Dohmann et al.

* cited by examiner

RACK BAR AND METHOD FOR MANUFACTURING RACK BAR

TECHNICAL FIELD

The present invention relates to a rack bar applied to a rack-and-pinion type steering device for vehicles to take part in transmitting a steering force to steered road wheels, for example, and to a method for manufacturing the rack bar.

BACKGROUND OF THE INVENTION

An example of rack bars that had conventionally been applied to rack-and-pinion type steering devices is disclosed in the following Patent Document 1, for example.

More specifically, this rack bar is molded by the so-called die forging wherein firstly a cylindrical rod-like solid material is sandwiched between upper-half and lower-half dies to cause plastic flow so that an excess of the material is flowed aside to form a pair of burrs. Additionally, the rack bar is provided with rack teeth over a certain axial range, each of which is formed in a circumferential direction of a circular cross section of the rack bar.

REFERENCES ABOUT PRIOR ART

Patent Documents

Patent Document 1: Japanese Patent Application Publication No. 2000-211536

SUMMARY OF THE INVENTION

However, since the rack teeth of the conventional rack bar are formed within a region of the circular cross section of the rack bar (i.e., a circular cross section of a rod), there has been a problem that the width of the rack teeth cannot sufficiently be ensured.

A probable cause of the above problem is that the plastic flow of the material cannot sufficiently be developed in die forging. However, even if forming the rack teeth by cutting, it is not possible to make the width of the rack teeth larger than the circular cross section of the rack bar and therefore it is difficult to solve the above-mentioned problem.

The present invention is contrived in view of the above technical problems, an object of which is to provide a rack bar formed by die forging to have rack teeth larger than a circular cross section of a material in width, and a method for manufacturing the same.

Means for Solving the Problems

An aspect of the present invention resides in a rack bar formed by conducting a die forging process on a metal rod-like material having an approximately circular cross section, characterized by comprising: a pair of face width-enlarged portions respectively provided at both ends that the rack teeth have in a face width direction, the face width-enlarged portions being formed such that the material flows plastically at the time of die forging thereby projecting outwardly from an outer shape of the approximately circular cross section of the material; and a pair of burr-removed portions formed by removing burrs and disposed such that a center position of the burrs is located biasedly from the axis toward the side of the rack teeth, the burrs being projectingly molded by the material having flowed into cavities defined between a first shaping die and a second shaping die, the first shaping die contributing to the formation of the rack teeth at the time of die forging while the second shaping die contributes to the die forging in cooperation with the first shaping die.

Incidentally, the rack bar is manufactured through: a forging step for performing die forging, where the material is deformed between the first and second shaping dies with pressure so that shapes of the rack teeth-forming section and the enlarged face width-forming sections are transferred to the material; and a burr-removing step of removing a part of the burrs that have been formed by the material flowing into the pair of burr-forming cavities at the forging step thereby forming a pair of burr-removed portions.

EFFECTS OF THE INVENTION

According to the present invention, by the presence of the pair of face width-enlarged portions, it becomes possible to ensure a face width dimension of the rack teeth larger than that of the circular cross section of the material, which results in an improvement of a contact gear ratio between the pinion teeth and the rack teeth.

Furthermore, the pair of face width-enlarged portions are formed by die forging and therefore more conveniently processed as compared with a case of forming these portions by closed die forging.

Additionally, the pair of burr-removed portions are disposed on the side of a top land of the rack teeth so as to offset the presence of the face width-enlarged portions, which brings about an advantage that the flowability of the material at pair of face width-enlarged portions is enhanced and therefore a defective formation of the material at the face width-enlarged portions is effectively prevented.

MODE(S) FOR CARRYING OUT THE INVENTION

Referring now to the accompanying drawings, some embodiments of a rack bar and the like according to the present invention will be discussed in detail. Incidentally, in the following embodiments, the rack bar is in a state of being applied to an automotive steering device as usual.

Figure 1:
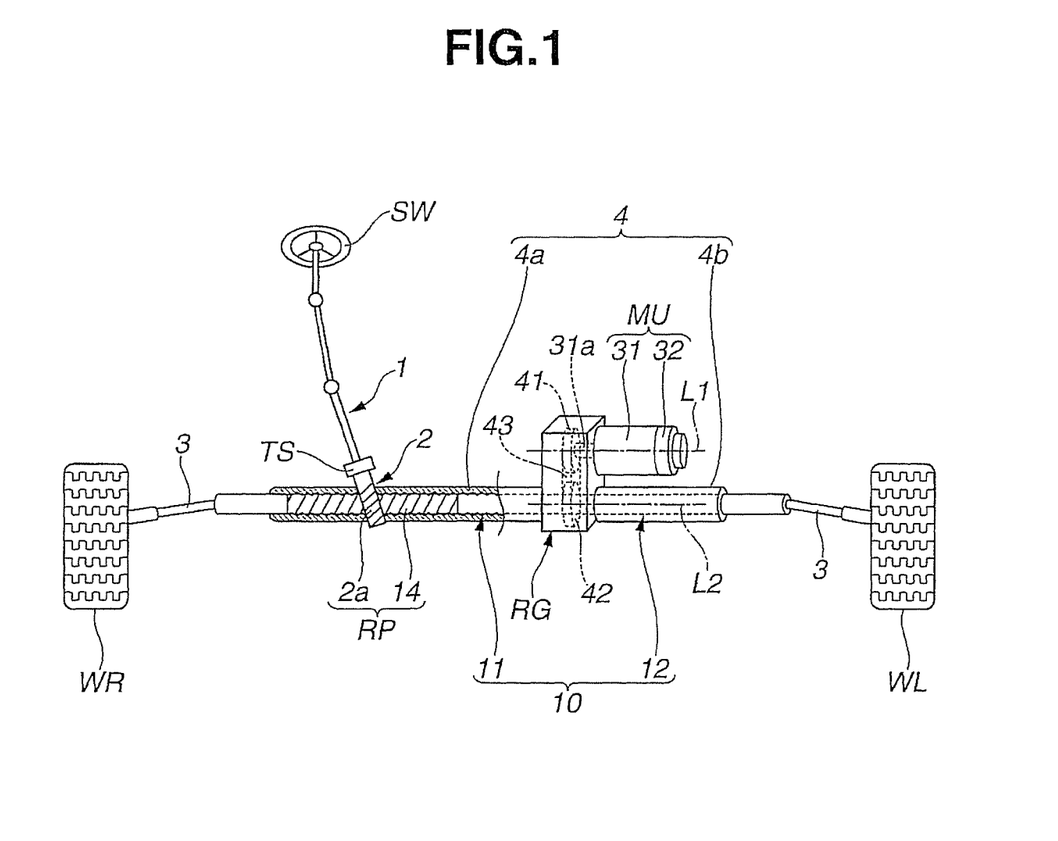
FIG. 1 A schematic view of a steering device to which a rack bar according to the present invention is applied.
Figure 2:
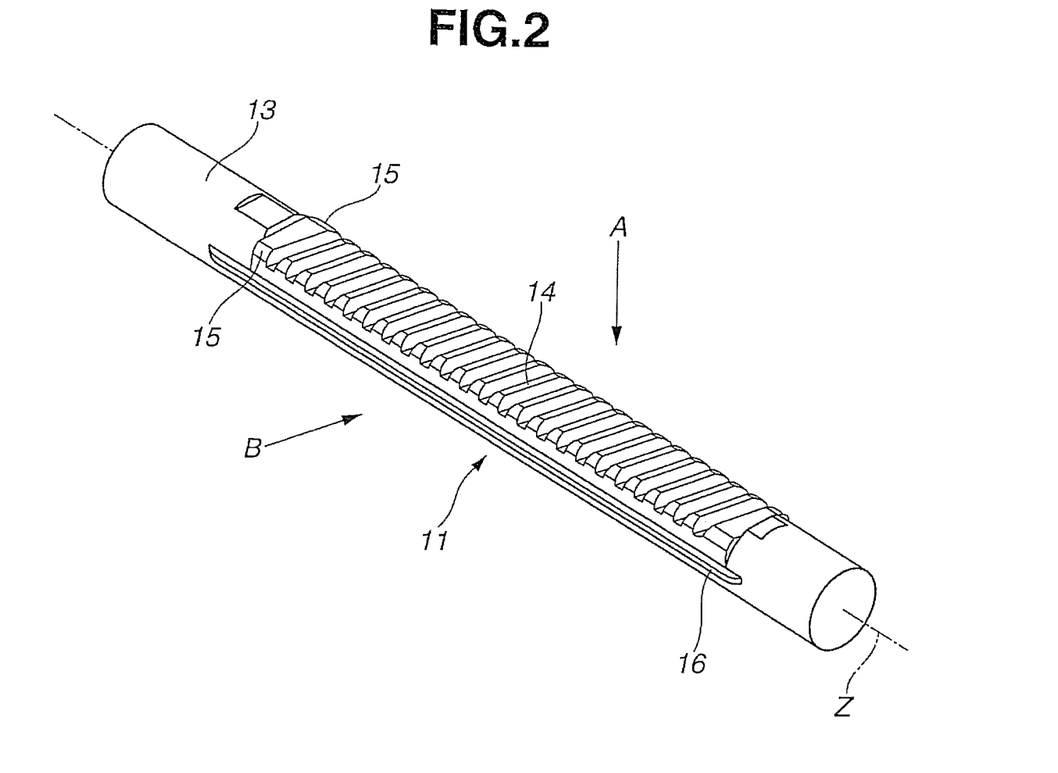
FIG. 2 A perspective view of the rack bar as shown in FIG. 1.
Figure 3:
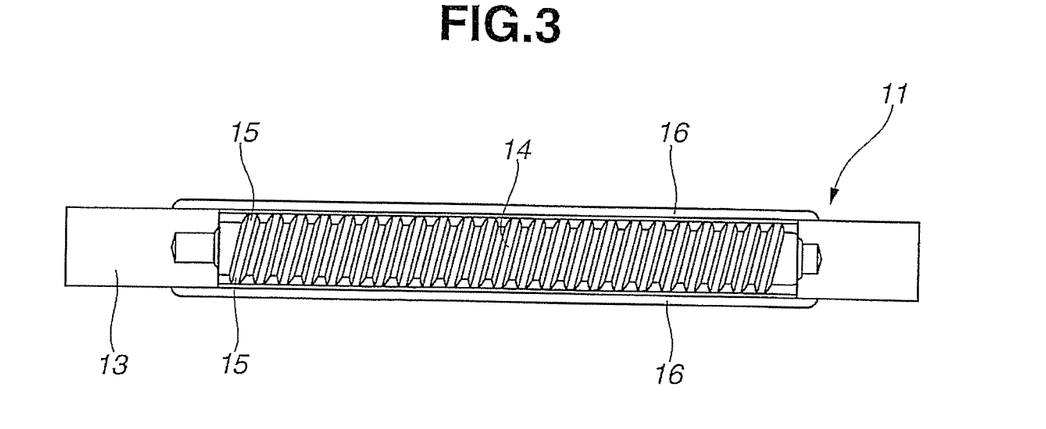
FIG. 3 A view of the rack bar, which is taken from a direction of the arrow "A" of FIG. 2.
Figure 4:
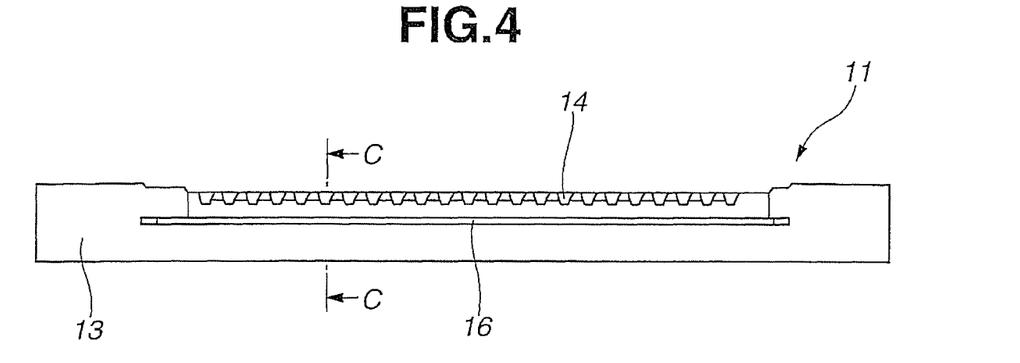
FIG. 4 A view of the rack bar, which is taken from a direction of the arrow "B" of FIG. 2.

FIGS. 1 to 6 show a first embodiment of a rack bar and the like according to the present invention. To begin with, an explanation will be made on a steering device in which the rack bar is used. As shown in FIG. 1, a steering device consists mainly of: an input shaft 1 connected to a steering wheel SW at one axial end to be able to rotate integrally with the steering wheel SW; an output shaft 2 connected at its one axial end to the other end of input shaft 1 through a torsion bar (not shown) to be able to rotate relative to input shaft 1, and connected at the other end to steered road wheels WL, WR through a rack-and-pinion mechanism RP; a monitor unit MU for transmitting a steering assist torque depending on a steering torque exerted by a driver to a undermentioned rack bar 10, the steering torque being based on detection results obtained by a torque sensor TS (for detecting a steering torque on the basis of a relative rotation displacement between input shaft 1 and output shaft 2) or by a vehicle speed sensor (not shown); and a reduction gear RG for reducing an output (a rotational force) of the motor unit MU and transmitting it to the undermentioned rack bar 10 while converting the rotational force into a force that can move rack bar 10 in an axial direction.

The above-mentioned rack-and-pinion mechanism RP is arranged such that pinion teeth 2a formed on an outer peripheral surface of one end region of output shaft 2 are engaged with rack teeth 14 formed over a certain axial range of the rod-like rack bar 10 disposed generally perpendicular to the pinion teeth 2a, thereby allowing rack bar 10 to move in the axial direction according to the rotational direction of output shaft 2. Additionally, rack bar 10 is connected, respectively at its both ends, to steered road wheels WR, WL through tie rods 3 and knuckle arms (not shown). When rack bar 10 is moved in the axial direction, one of the knuckle arms (not shown) is pulled through tie rod 3 thereby changing the direction of steered road wheels WR, WL.

Rack bar 10 is configured in such a manner as to join first member 11 to second member 12, the first member 11 having rack teeth 14 at its outer peripheral surface to take part in rack-and-pinion mechanism RP, the second member 12 having at its outer peripheral surface ball screw splines (not shown) to take part in the undermentioned ball screw mechanism (not shown). Additionally, rack bar 10 is axially movably disposed inside a housing 4 including first housing 4a (which houses rack-and-pinion mechanism RP) at one end side and second housing 4b (which houses reduction gear RG) at the other end side, the first and second housings 4a, 4b being joined with a bolt (not shown).

As shown in FIGS. 2 to 5, the above-mentioned first member 11 is provided to include: rack main body 13 formed of a rod-like metal material having an approximately circular cross section; rack teeth 14 formed around the center axis "Z" of the approximately circular cross section (hereinafter referred to merely as "a circular cross section") of rack main body 13, the rack teeth 14 being molded by die forging as will be discussed below; a pair of face width-enlarged portions 15 extending from both ends of the rack teeth 14 in a face width direction (i.e., a direction indicated by X in FIG. 5) to contribute to enlargement of the face width of rack teeth 14; and a pair of burr-removed portions 16 formed by removing a part of the undermentioned burrs 18 (generated by die forging and shown in FIG. 6(c)). Rack teeth 14 are provided almost at the middle of the longitudinal direction of first member 11; in other words, the first member 11 has a configuration where rack teeth 14 are formed generally symmetric with respect to the middle of the first member 11.

Figure 5:
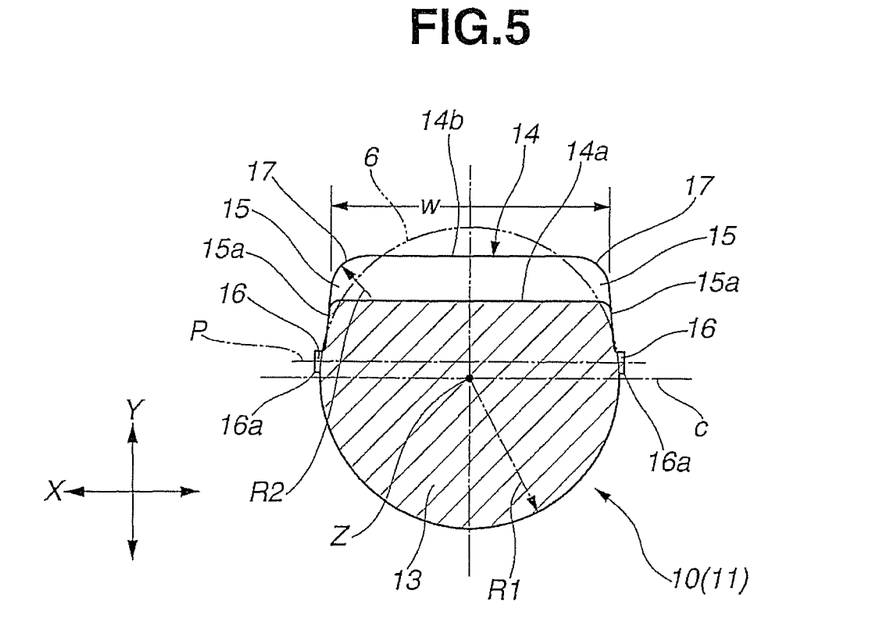
FIG. 5 A sectional view taken along the line "C-C" of FIG. 4.

As shown in FIG. 5 in particular, face width-enlarged portions 15 are formed by plastic flow of the material concurrently with the formation of rack teeth 14 achieved by pressure deformation at the time of the undermentioned die forging, in such a manner as to protrude outwardly from the outer shape S (indicated in FIG. 5 by an imaginary line) of the circular cross section or protrude outwardly from the outer shape S of the circular cross section in the radial direction originating from the center axis Z.

Furthermore, face width-enlarged portions 15 are formed such that a dimension W that rack teeth 14 have in the face width direction (in other words, "face width dimension W") is gradually decreased from a bottom land toward a top land of rack teeth 14. Both ends of the face width-enlarged portions 15 in the face width direction are configured to serve as tapered portions 15a. Additionally, face width-enlarged portions 15 are provided with a pair of arcuate portions 17 (chamfered to have a rounded surface where a radius of curvature R2 is smaller than a radius of curvature R1 of the material, i.e., a radius of curvature R1 of rack main body 13) at the both ends in the face width direction, more specifically at locations outward from a bottom land 14a and outward from outer shape S of the circular cross section in the radial direction of the center axis Z of the rack main body 13, and more specifically at corners configured to have tapered portions 15a and a top land 14b and disposed outermost from the center axis Z in the radial direction.

The above-mentioned burr-removed portions 16 are formed in such a manner as to remove the top of a pair of burrs 18 projectingly molded by the above-mentioned material flowing into burr-forming cavities 23 (defined between first shaping die D1 and second shaping die D2 for die forging) concurrently with the formation of rack teeth 14. Additionally, burr-removed portions 16 are provided such that center position P of burrs 18 is located biasedly from center axis Z of rack main body 13 (or from center line C passing through center axis Z) toward the side of rack teeth 14. More specifically, burr-removed portions 16 are provided such that their parts located farthermost from rack teeth 14 in direction Y perpendicular to the face width direction X (i.e., lower end parts 16a as shown in FIG. 5) are coincident with center axis Z (or center line C).

The above-mentioned motor unit MU is fixedly supported by second housing 4b at one axial end side where output shaft 31a protrudes as shown in FIG. 1, and integrally assembled from electric motor 31 (for rotationally driving the undermentioned input pulley 41 thereby transmitting a steering assist torque to rack bar 10 through reduction gear RG) and electronic controller 32 (attached to the other side of the electric motor 31 for controlling the driving of the electric motor 31 depending on certain parameters such as the steering torque and the vehicle speed).

The above-mentioned reduction gear RG is assembled mainly from; input pulley 41 integrally rotatably attached to the outer periphery of output shaft 31a of electric motor 31 so as to rotate about axis L1 of output shaft 31a; output pulley 42 relationally rotatably attached to the outer periphery of rack bar 10 so as to rotate about axis L2 of rack bar 10 when receiving the rotational force from input pulley 41; ball screw splines (not shown) mounted between output pulley 42 and rack bar 10, for converting the rotational force into axial movements of rack bar 10 while reducing the speed of the rotations of output pulley 42; and a belt 43 wound about both input pulley 41 and output pulley 42 for transmitting the rotations of input pulley 41 to output pulley 42 thereby achieving a coincidental rotation of both pulleys 41 and 42.

Referring now to FIGS. 6(a) to 6(d), a method for manufacturing rack bar 10 according to the first embodiment of the present invention will be discussed in detail.

Before discussing the method for manufacturing rack bar 10, there will be made an explanation of a shaping die to be used in the manufacturing method. As shown in FIG. 6(a), the shaping die is comprised of: first shaping die D1 disposed on one side of a material (or rack main body 13) with respect to axis Z of the material (rack main body 13) and serving as a movable-side die to contribute to the formation of rack teeth 14; and second shaping die D2 disposed on the side opposite to first shaping die D1 and serving as a fixed-side die to contribute to the undermentioned die forging in cooperation with first shaping die D1.

First shaping die D1 is provided to have: rack teeth-forming section 21 unevenly formed at its inner bottom to contribute to the formation of rack teeth 14; a pair of enlarged face width-forming sections 22 located at both ends of rack teeth-forming section 21 to contribute to the formation of face width-enlarged portions 15 concurrently with the formation of rack teeth 14; and a pair of burr-forming sections 23 so formed as to concave the surface which is to be brought into contact with second shaping die D2, to contribute to the formation of burrs 18. On the other hand, second shaping die D2 has material-supporting section 24 recessed semicircular in cross section to correspond to the outer shape of material M1. The material is allowed to be supported in the presence of material-supporting section 24 at the time of the undermentioned die forging.

Figure 6:
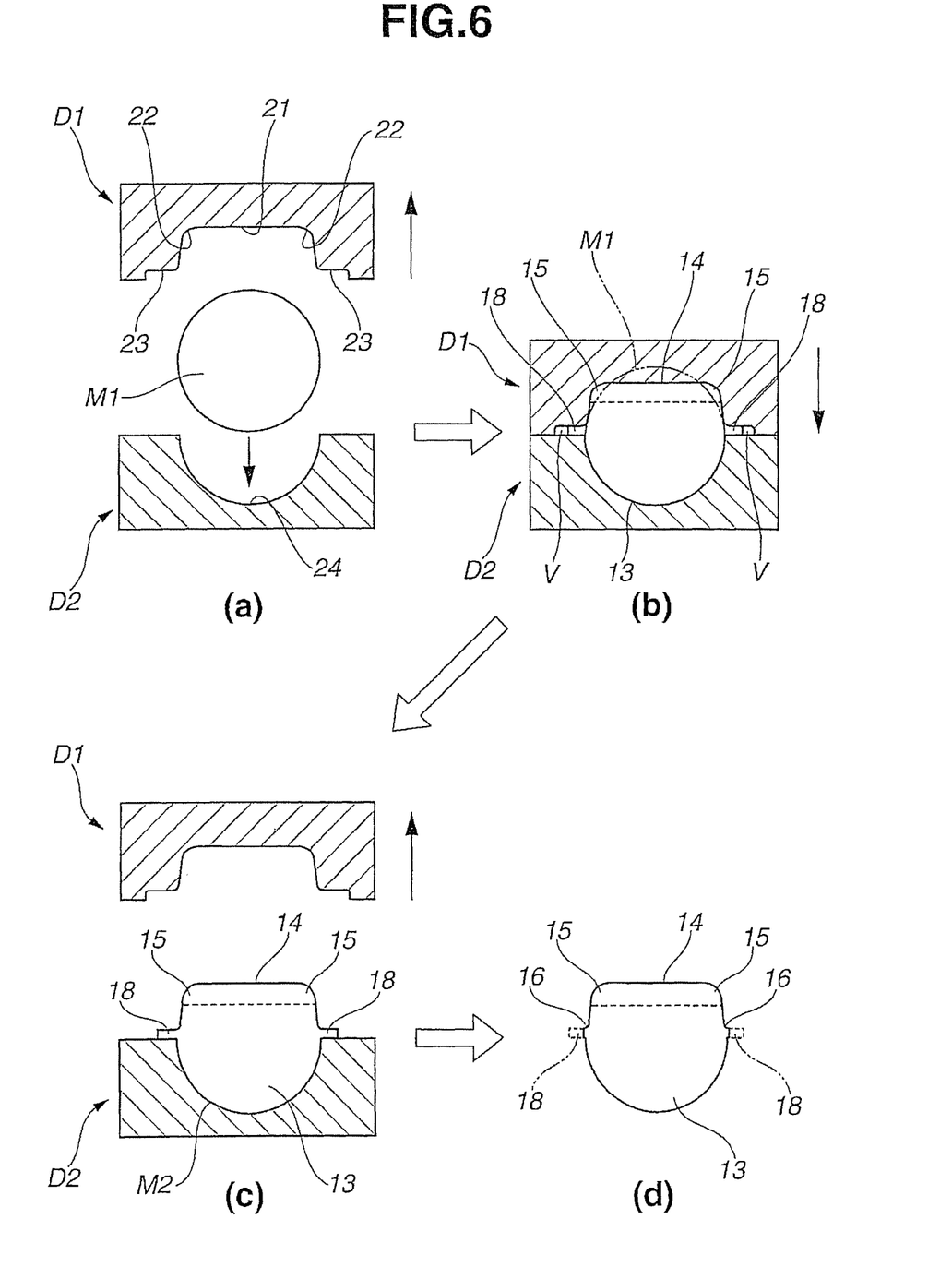
FIG. 6 A view similar to FIG. 5 but for explaining manufacturing steps of a method for forming the rack bar according to the present invention, wherein (a) illustrates a state of a material being interposed between dies, (b) illustrates a forging step, (c) illustrates a state where a forged workpiece article is released from the dies and (d) illustrates a burr-removing step.

At the time of manufacturing rack bar 10 in use of the first and second shaping dies D1, D2, first shaping die D1 is lifted up to open the shaping die, and then material M1 is disposed on material-supporting section 24 of second shaping die D2 as shown in FIG. 6(a).

Subsequently, first shaping die D1 is pulled down as shown in FIG. 6(b) in such a manner as to interpose material M1 between the first and second shaping dies D1, D2, thereby pressurizing material M1 to deform. With this, shapes of rack teeth-forming section 21 and enlarged face width-forming sections 22 are transferred to material M1 thereby achieving die forging (a forging step according to the present invention). More specifically, material M1 is pressurized by rack teeth-forming section 21 of first shaping die D1 and therefore the top end part of material M1 is deformed, and then this deformed amount of the material plastically flows toward both sides or into enlarged face width-forming sections 22 and burr-forming sections 23 (more concretely, gaps V defined among the first and second shaping dies D1, D2 and burr-forming sections 23). With this, shapes of rack teeth-forming section 21 and enlarged face width-forming sections 22 are transferred to material M1 thereby producing rack teeth 14 that include a pair of face width-enlarged portions 15 while providing a pair of burrs 18 by virtue of the presence of burr-forming sections 23 or gaps V.

Then, first shaping die D1 is lifted up again to open the shaping die as shown in FIG. 6(c), and forged article M2 that has undergone the forging process is taken therefrom. Finally, the tops of the pair of burrs 18 formed by the above-mentioned forging process are cut off to produce a pair of burr-removed portions 16 as shown in FIG. 6(d) (a burr-removing step according to the present invention) thereby completing manufacture of rack bar 10.

As has been discussed above, according to rack bar 10 which relates to the present embodiment, there are provided a pair of face width-enlarged portions 15. With this arrangement, it becomes possible to make face width dimension W of rack teeth 14 larger than the circular cross section of rack main body 13 (or than the outer shape S of the material). As a result, a contact gear ratio between pinion teeth 3a and rack teeth 14 can be improved.

In addition, the pair of face width-enlarged portions 15 are formed by die forging and therefore more conveniently obtainable at lower cost as compared with a case of forming these portions by closed die forging. Hence a reduction in productivity of rack bar 10 and an increase in cost, which can occur by providing the pair of face width-enlarged portions 15, are suppressed to the minimum possible extent.

Moreover, the pair of burr-removed portions 16 are disposed on the side of rack teeth 14 so as to offset the formation of the pair of face width-enlarged portions 15 (as shown in FIG. 5). With this arrangement, the flowability of the material toward the pair of enlarged face width-forming sections 22 is improved while enhancing the filling ability in enlarged face width-forming sections 22 at the time of forging process. As a result, it becomes possible to prevent the material from being defectively formed at face width-enlarged portions 15.

In the present embodiment, burr-removed portions 16 are provided such that their parts farthermost from rack teeth 14 in a direction Y perpendicular to the face width direction of rack teeth 14 (i.e., direction X), which are indicated as lower end parts 16a in FIG. 5, are located coincident with center axis Z or center line C. With this, burr-removed portions 16 are disposed on the side of rack teeth 14 enough to offset the presence of the face width-enlarged portions 15, which brings about an advantage that a defective formation of the material at face width-enlarged portions 15 is more effectively prevented.

Additionally, face width-enlarged portions 15 are formed such that a face width dimension W of rack teeth 14 including the face width-enlarged portions 15 is gradually decreased from a bottom land toward a top land of the rack teeth 14, and more specifically, face width dimension W of the top land disposed farther from axis Z of rack main body 13 is provided to be gradually decreased. With this, the filling ability into enlarged face width-forming sections 22 at the time of forging process is more enhanced so that it becomes possible to effectually prevent a defective formation of the material at face width-enlarged portions 15.

In addition, face width-enlarged portions 15 are provided with a pair of arcuate portions 17 at the both ends in the face width direction. With this, the filling ability of the material is improved even in enlarged face width-forming sections 22 (more specifically, in a region located farthermost from axis Z of rack main body 13), so that it becomes possible to prevent a defective formation of the material at face width-enlarged portions 15 effectually.

Furthermore, the pair of arcuate portions 17 are disposed outward from bottom land 14a of rack teeth 15 in the radial direction of rack main body 13 originating from axis Z as shown in FIG. 5. With this arrangement, the filling ability of the material is further improved even in enlarged face width-forming sections 22 (more specifically, in a region located farthermost from axis Z of rack main body 13), which results in an advantage that a defective formation of the material at face width-enlarged portions 15 is more effectively prevented.

In addition, the pair of arcuate portions 17 are located outside the outer shape S of rack main body 13 in the radial direction of rack main body 13 originating from axis Z as shown in FIG. 5. According to this arrangement, it becomes possible to ensure a face width dimension W larger than the circular cross section of rack main body 13 concurrently with the formation of the pair of arcuate portions 17.

Additionally, first member 11 of rack bar 10 is provided to have rack teeth 14 almost at the middle of its longitudinal direction, which allows first member 11 to have a configuration generally symmetrical in the longitudinal direction. As a result of this, first member 11 is well-balanced at the time of die forging and therefore improved in molding accuracy.

Figure 7:
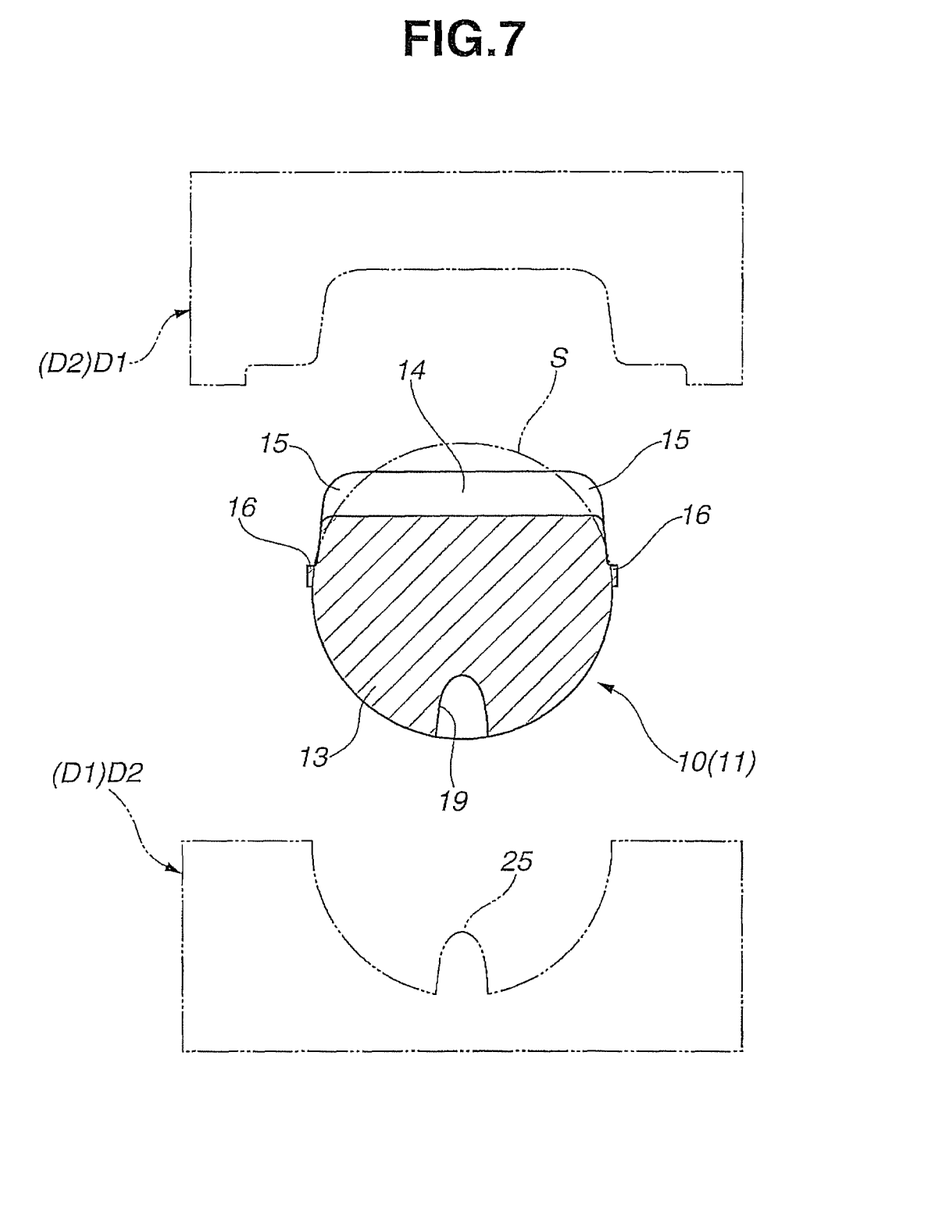
FIG. 7 A view similar to FIG. 5 but showing a second embodiment of the rack bar according to the present invention.

FIG. 7 shows a second embodiment of the rack bar and the method for manufacturing the same according to the present invention, in which rack bar 10 that has been discussed in the first embodiment is provided to have a bore 19 at its lower end portion (or at a location opposite to rack teeth 14 with respect to axis Z of rack main body 13), the bore 19 being formed scooped inwardly from the circular cross section or outer shape S of rack main body 13 (or the material) in the radial direction originating from axis Z.

Bore 19 may be formed concurrently with the forging process discussed in the first embodiment, or may separately be formed by an additional forging process after the above-mentioned forging steps. In other words, bore 19 can be formed by providing the second or the fixed-side shaping die D2 with bore-forming section 25 that is to act for the formation of bore 19. Furthermore, bore 19 may be formed also by providing the first or the movable-side shaping die D1 with bore-forming section 25.

As discussed above, in the second embodiment, bore-forming section 25 is provided in die forging of rack teeth 14. With this arrangement, the plastic flow of the material is so modified by the presence of bore 19 formed by forging as to enhance the flowability of the material (which flowability relates to the formation of face width-enlarged portions 15); in other words, the filling ability of the material is improved at enlarged face width-forming sections 22. As a result, it becomes possible to more effectively prevent the material from being defectively formed at face width-enlarged portions 15.

The invention is not limited to the configurations of the embodiments as described above. For example, a range over which rack teeth 14 are formed (a longitudinal range), a shape of second member 12, and the like may be arbitrarily modified according to specifications of the steering devices to which the rack bar 10 is applied.

More specifically, although either of the above-mentioned embodiments exemplifies rack bar 10 as being applied to a belt-driven electric power steering device, the present invention is not limited to the above-mentioned type of steering device and therefore applicable to various steering devices such as a dual pinion type electric power steering device.

Hereinafter, technical ideas obvious from the above embodiments, except for those discussed in claim, will be discussed.

(a) A rack bar as claimed in claim 3, characterized in that the pair of arcuate portions are formed outwardly from the bottom land of the rack teeth in the radial direction originating from the axis.

According to this configuration, the filling ability of the material in a portion which may be located farther from the axis is improved, and a defective formation of the material at the face width-enlarged portions is more effectively prevented.

(b) A rack bar as claimed in claim 3, characterized in that the pair of arcuate portions are formed outwardly from the outer shape of the material in the radial direction originating from the axis.

According to this configuration, it is possible to ensure a face width dimension of the rack teeth larger than that of the circular cross section of the material while providing the arcuate portions.

(c) A rack bar as claimed in claim 1, characterized in that the rack teeth are formed almost at the middle region of the longitudinal direction of the material.

According to this configuration, the shape of the rack bar is made generally symmetrical in the longitudinal direction. As a result of this, the rack bar is well-balanced at the time of die forging and therefore improved in molding accuracy.

(d) A rack bar as claimed in claim 1, characterized in that a bore is provided at a location opposite to the rack teeth with respect to the axis, the bore being formed scooped inwardly from the approximately circular cross section of the material in the radial direction originating from the axis.

According to this configuration, the filling ability of the material in the face width-enlarged portions is improved with a reduced amount of the material which reduction is generated by the presence of the bore. This arrangement contributes to a further prevention of the defective formation of the material at the face width-enlarged portions.

(e) A method for manufacturing a rack bar, as claimed in claim 6, characterized by further comprising the step of providing the pair of face width-enlarged portions with a pair of arcuate portions at both ends in the face width direction, the arcuate portions having a radius of curvature smaller than that of the material.

According to this configuration, by virtue of the presence of the pair of arcuate portions, the filling ability of the material in a portion which may be farthermost from the axis is improved and therefore a defective formation of the material at the face width-enlarged portions is more effectively prevented.

(f) A method for manufacturing a rack bar, as discussed in the above (e), characterized in that the pair of arcuate portions are formed outwardly from the bottom land of the rack teeth in the radial direction originating from the axis.

According to this configuration, the filling ability of the material in a portion which may be located farther from the axis is improved, and a defective formation of the material at the face width-enlarged portions is more effectively prevented.

(g) A method for manufacturing a rack bar, as discussed in the above (e), characterized in that the pair of arcuate portions are formed outwardly from the outer shape of the material in the radial direction originating from the axis.

According to this configuration, it is possible to ensure a face width dimension of the rack teeth larger than that of the circular cross section of the material while providing the arcuate portions.

(h) A method for manufacturing a rack bar, as claimed in claim 5, characterized in that the pair of burr-removed portions respectively have parts located farthermost from the rack teeth in a direction perpendicular to the face width direction which parts are disposed coincident with the axis or biased from the axis toward the side of the rack teeth.

According to this configuration, the pair of burr-removed portions are disposed sufficiently within the side of the rack teeth so as to offset the presence of the face width-enlarged portions, with which it becomes possible to more effectively prevent a defective formation of the material at the face width-enlarged portions.

(i) A method for manufacturing a rack bar, as claimed in claim 5, characterized in that the rack teeth are formed almost at the middle region of the longitudinal direction of the material.

According to this configuration, the shape of the rack bar is made generally symmetrical in the longitudinal direction. With this, the rack bar is well-balanced at the time of die forging and therefore improved in molding accuracy.

(j) A method for manufacturing a rack bar, as claimed in claim 5, characterized in that a bore is provided at a location opposite to the rack teeth with respect to the axis, the bore being formed scooped inwardly from the outer shape of the material in the radial direction originating from the axis.

According to this configuration, the filling ability of the material in the face width-enlarged portions is improved with a reduced amount of the material which reduction is generated by the presence of the bore. This arrangement contributes to a further prevention of the defective formation of the material at the face width-enlarged portions.

EXPLANATION OF REFERENCE NUMERALS

10 Rack bar
13 Rack main body
14 Rack teeth
15 Face width-enlarged portions
16 Burr-removed portions
Z Axis
S Outer shape

The invention claimed is:

1. A method of manufacturing a rack bar for transmitting a steering operation to steered wheels while converting a rotational movement of a pinion shaft rotatably connected to a steering wheel into an axial movement by the presence of rack teeth engageable with pinion teeth formed on the pinion shaft, the rack bar being formed by conducting a die forging process on a rod-like metal material having an approximately circular cross section, comprising:

a step of processing the material between a first shaping die and a second shaping die, the first shaping die being located on one side of the material with respect to an axis passing through a center of an approximately circular cross section of the material to contribute to the formation of rack teeth while the second shaping die is located on the side opposite to the first shaping die to contribute to die forging in cooperation with the first shaping die, the first shaping die including a rack teeth-forming section that contributes to the formation of the rack teeth and enlarged face width-forming sections for forming a pair of face width-enlarged portions by making the material flow plastically at the time of die forging to project outwardly from an outer portion of the approximately circular cross section of the material, the face width-enlarged portions being provided at both ends of the rack teeth in a face width direction, the first and second shaping dies defining a pair of burr-forming cavities or gaps therebetween, a center position of which being located biasedly from the axis toward the side of the rack teeth, the burr-forming cavities or gaps being able to form a pair of burrs when the material is flowed thereinto;

a forging step for performing die forging, where the material is deformed between the first and second shaping dies with pressure so that shapes of the rack teeth-forming section and the enlarged face width-forming sections are transferred to the material; and a burr-removing step of removing a part of the burrs that have been formed by the material flowing into the pair of burr-forming cavities at the forging step, thereby forming a pair of burr-removed portions, wherein the pair of face width-enlarged portions are formed such that a face width dimension of the rack teeth including the face width-enlarged portions is gradually decreased from a bottom land toward a top land of the rack teeth, and wherein the pair of face width-enlarged portions are provided with a pair of arcuate portions at both ends in the face width direction, the arcuate portions having a radius of curvature smaller than that of the material.

2. The method of manufacturing a rack bar, as claimed in claim 1, wherein the pair of arcuate portions are formed outwardly from the bottom land of the rack teeth in the radial direction originating from the axis.

3. The method of manufacturing a rack bar, as claimed in claim 1, wherein the pair of arcuate portions are formed outwardly from the outer portion of the material in the radial direction originating from the axis.

4. The method of manufacturing a rack bar, as claimed in claim 1, wherein:

the burr-removing step comprises removing the part of the burrs so as to thereby form a pair of burr-removed portions, and parts of the pair of burr-removed portions located away from the rack teeth in a direction perpendicular to the face width direction are disposed coincident with the axis or biased from the axis toward the side of the rack teeth.

5. The method of manufacturing a rack bar, as claimed in claim 1, wherein the rack teeth are formed at a middle region of the material in a longitudinal direction of the material.

6. A method of manufacturing a rack bar for transmitting a steering operation to steered wheels while converting a rotational movement of a pinion shaft rotatably connected to a steering wheel into an axial movement by the presence of rack teeth engageable with pinion teeth formed on the pinion shaft, the rack bar being formed by conducting a die forging process on a rod-like metal material having an approximately circular cross section, comprising:

a step of processing the material between a first shaping die and a second shaping die, the first shaping die being located on one side of the material with respect to an axis passing through a center of an approximately circular cross section of the material to contribute to the formation of rack teeth while the second shaping die is located on the side opposite to the first shaping die to contribute to die forging in cooperation with the first shaping die, the first shaping die including a rack teeth-forming section that contributes to the formation of the rack teeth and enlarged face width-forming sections for forming a pair of face width-enlarged portions by making the material flow plastically at the time of die forging to project outwardly from an outer portion of the approximately circular cross section of the material, the face width-enlarged portions being provided at both ends of the rack teeth in a face width direction, the first and second shaping dies defining a pair of burr-forming cavities or gaps therebetween, a center position of which being located biasedly from the axis toward the side of the rack teeth, the burr-forming cavities or gaps being able to form a pair of burrs when the material is flowed thereinto;

a forging step for performing die forging, where the material is deformed between the first and second shaping dies with pressure so that shapes of the rack teeth-forming section and the enlarged face width-forming sections are transferred to the material; and a burr-removing step of removing a part of the burrs that have been formed by the material flowing into the pair of burr-forming cavities at the forging step,
wherein a bore is provided at a location opposite to the rack teeth with respect to the axis, the bore being formed so as to be scooped inwardly from the approximately circular cross section of the material in a radial direction originating from the axis.

\* \* \* \* \*